(12) United States Patent
Pescheck et al.

(10) Patent No.: US 7,714,685 B2
(45) Date of Patent: May 11, 2010

(54) ELECTROMAGNETICALLY OPERATED UNIT, IN PARTICULAR A CLUTCH, BRAKE AND/OR LOCK

(75) Inventors: Jurgen Pescheck, Immenstaad (DE); Stefan Unseld, Weissensberg (DE); Konrad Thoma, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 317 days.

(21) Appl. No.: 11/805,036

(22) Filed: May 22, 2007

(65) Prior Publication Data
US 2007/0272509 A1    Nov. 29, 2007

(30) Foreign Application Priority Data
May 24, 2006    (DE) .................. 10 2006 024 276

(51) Int. Cl.
*H01F 1/00*    (2006.01)
(52) U.S. Cl. .................. 335/296; 335/216; 181/161
(58) Field of Classification Search .................. 335/216, 335/220–229, 296; 181/161–164
See application file for complete search history.

(56) References Cited

U.S. PATENT DOCUMENTS

| | | | |
|---|---|---|---|
| 4,069,901 A * | 1/1978 | Sessler | 192/35 |
| 4,206,837 A | 6/1980 | Brown et al. | |
| 4,271,948 A | 6/1981 | Yew | |
| 4,788,463 A | 11/1988 | Layh | |
| 4,881,624 A | 11/1989 | Ulmann | |
| 5,185,542 A * | 2/1993 | Lazorchak | 310/36 |
| 5,443,132 A * | 8/1995 | Arnold | 188/138 |
| 5,712,520 A * | 1/1998 | Lamb | 310/92 |
| 5,873,443 A | 2/1999 | Meller et al. | |
| 6,343,680 B1 | 2/2002 | Hakamada et al. | |
| 6,802,402 B2 | 10/2004 | Bausch et al. | |

FOREIGN PATENT DOCUMENTS

| | | |
|---|---|---|
| CH | 286608 | 10/1952 |
| DE | 760 064 | 2/1953 |
| DE | 1 140 033 | 11/1962 |
| DE | 30 05 729 | 9/1980 |
| DE | 36 20 797 A1 | 12/1987 |
| DE | 196 13 763 | 5/1997 |
| DE | 100 10 171 A1 | 1/2001 |
| DE | 101 27 664 C1 | 4/2003 |
| GB | 1 211 652 | 11/1970 |
| JP | 2002/005193 | 1/2002 |

* cited by examiner

*Primary Examiner*—Lincoln Donovan
*Assistant Examiner*—Bernard Rojas
(74) *Attorney, Agent, or Firm*—Davis & Bujold, P.L.L.C.

(57) ABSTRACT

An electromagnetically operated unit for controlling a radial connection. The unit has a first device which is optionally coupleable with a second device. The second device includes a magnet and/or electromagnet. The unit also has radially movable switching elements that are supported about the circumference of one of the devices, which additionally has contoured and/or frictional surfaces, which mate with respective contoured and/or frictional surfaces of the other one of the devices, thus effectuate engagement of the first and second devices. When the unit is designed with a closed current system the switching elements are biased to disengage when current is applied to the magnet and with an open current system the switching elements are biased to engage, against the force of a spring, when current is applied to the magnet.

10 Claims, 5 Drawing Sheets

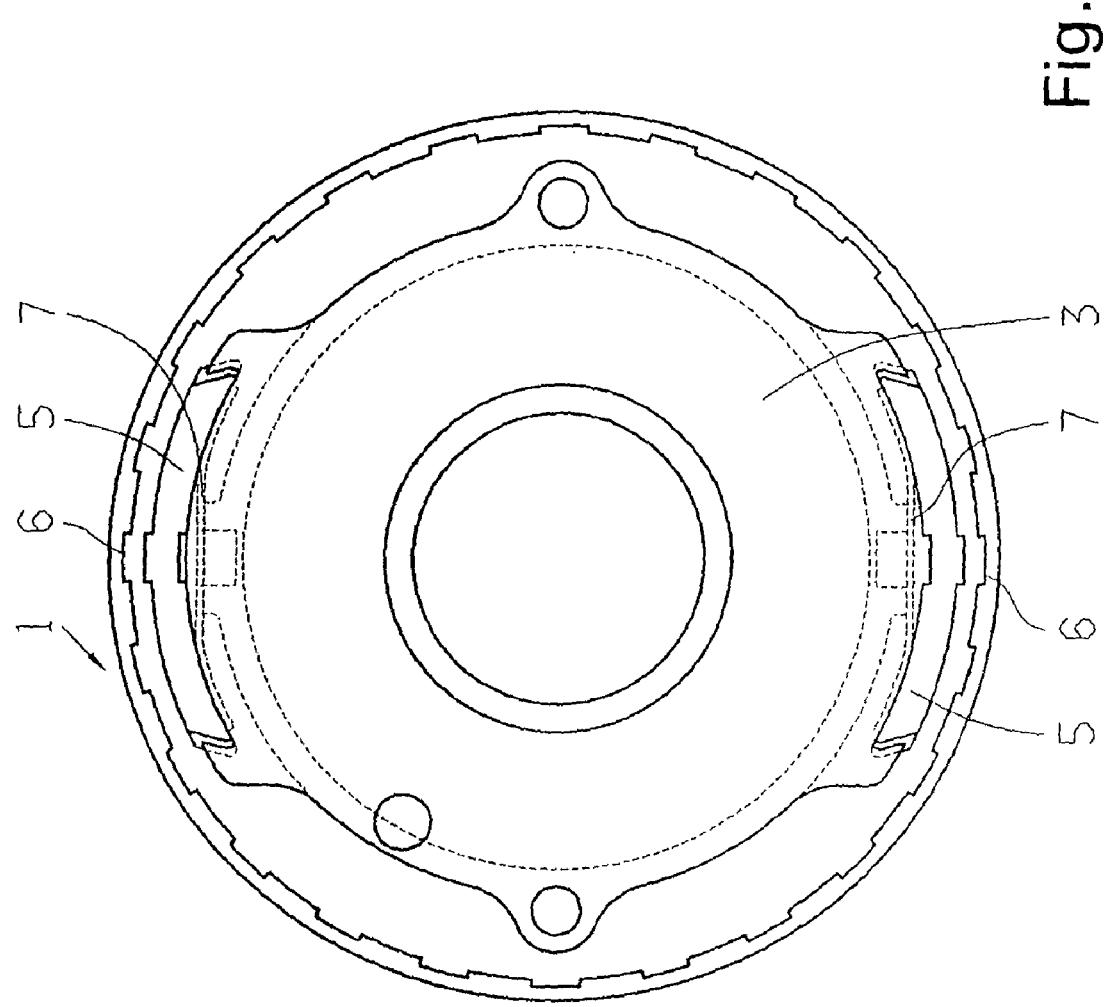
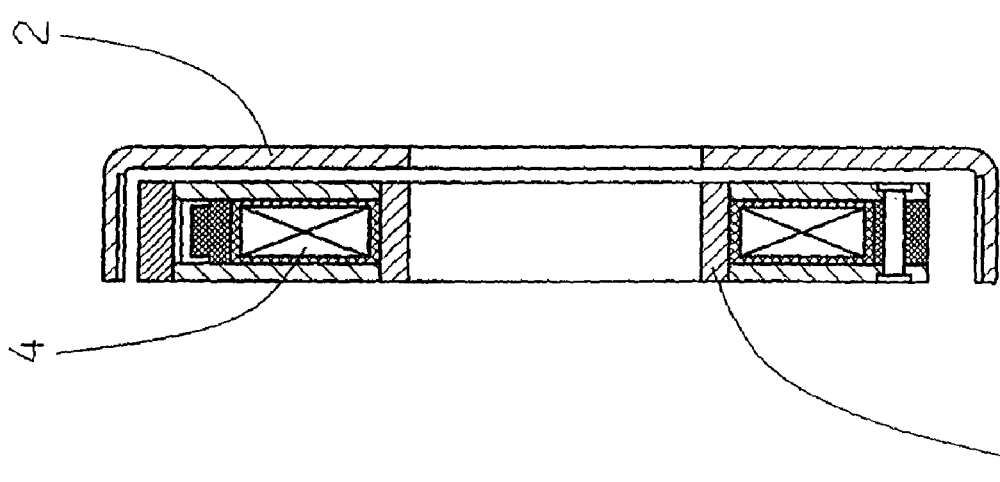

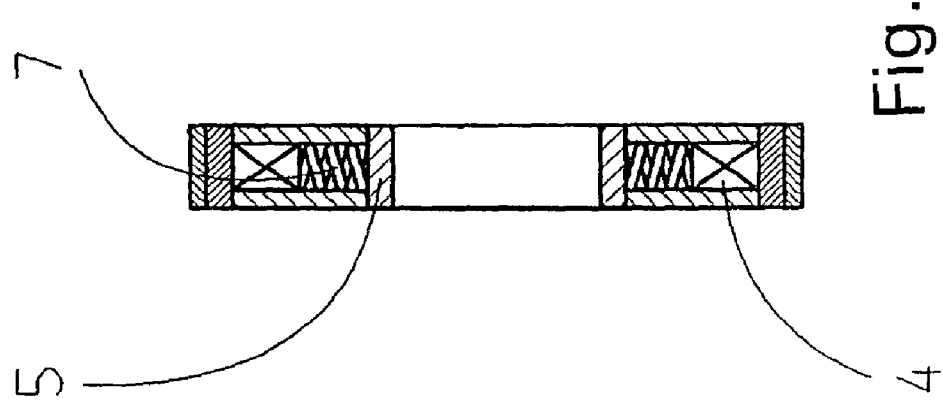
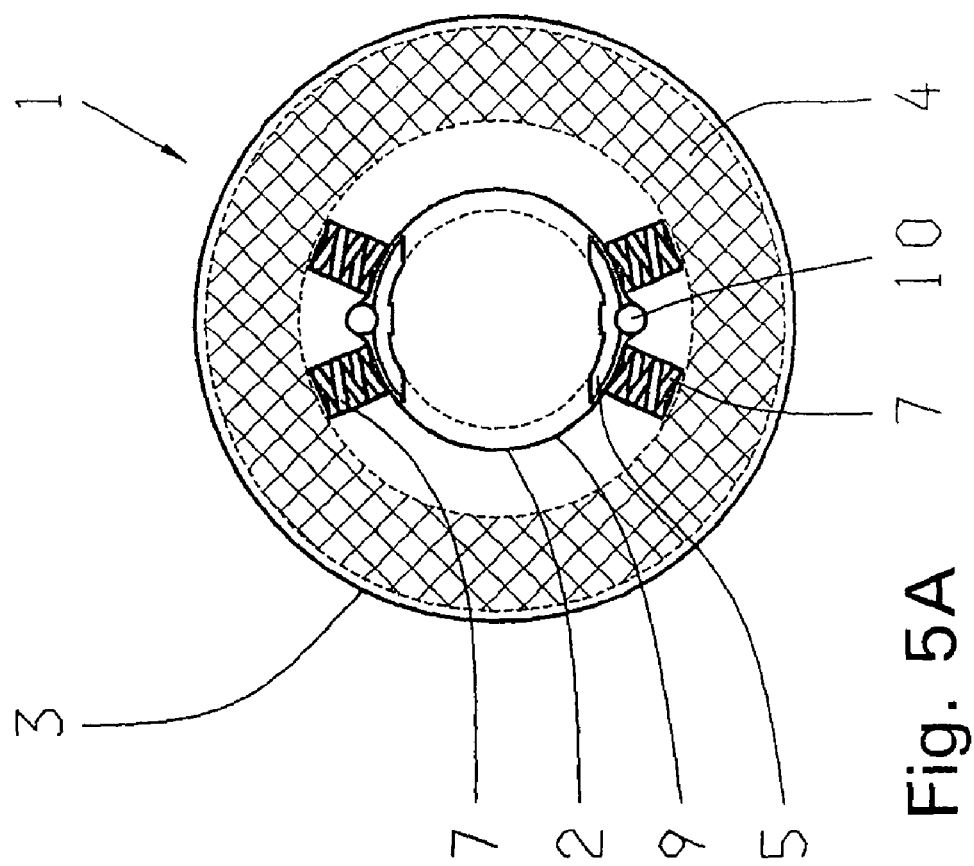

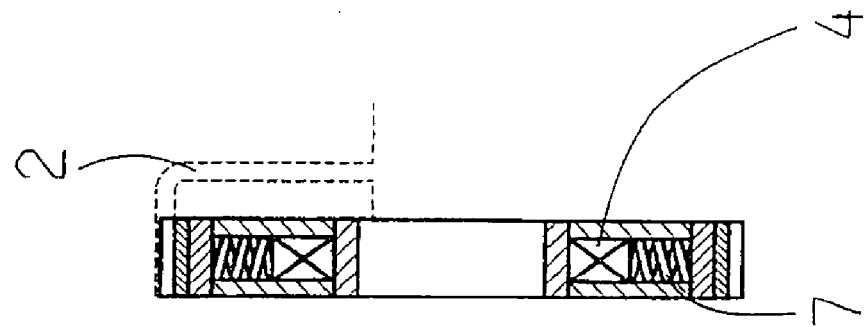
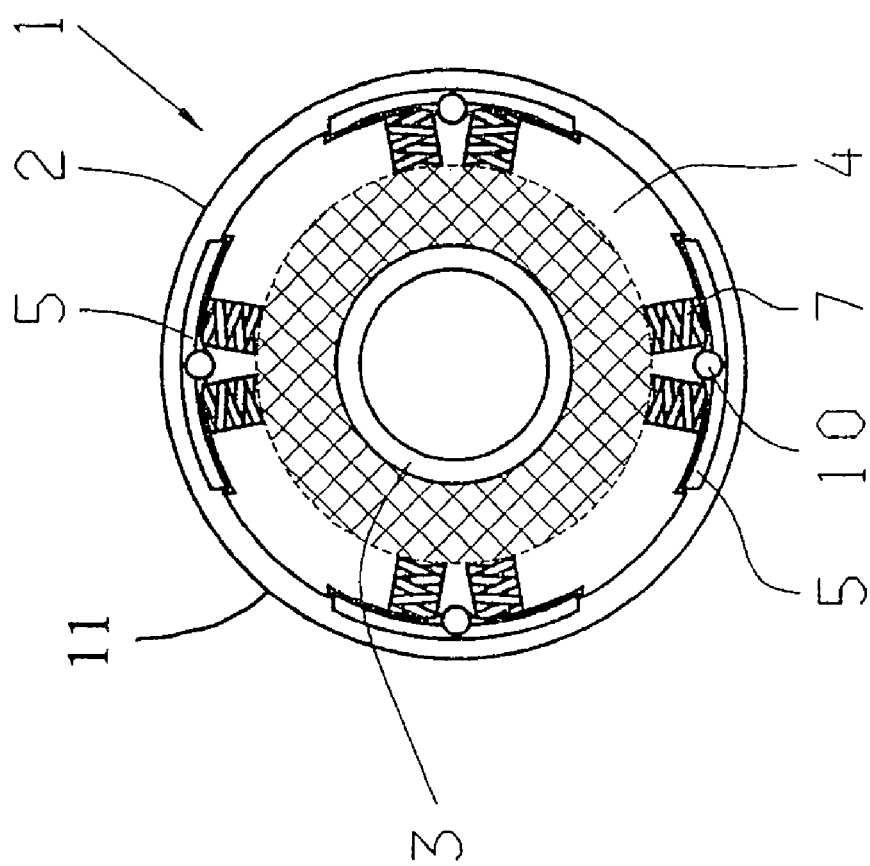

ELECTROMAGNETICALLY OPERATED UNIT, IN PARTICULAR A CLUTCH, BRAKE AND/OR LOCK

This application claims priority from German Application Serial No. 10 2006 024 276.9 filed on May 24, 2006.

FIELD OF THE INVENTION

The present invention is related to an electromagnetically operated unit, in particular a clutch, brake and/or lock.

BACKGROUND OF THE INVENTION

Multiple designs and embodiments of electromagnetic clutches and/or brakes are well-known in automotive engineering.

In this connection, also known are frictional locking systems, for example single-surface brakes, or disk brakes and disk clutches respectively, as well as positive locking systems, like tooth clutches, that usually execute axial switching movements.

From 196 13 763 C1, a switchable braking or coupling device (friction brake and/or friction clutch) is known, comprising a first part of the device having an axially movable pressure ring, which is movable against a second part of the device by actuating and resetting the devices between two axially offset working positions. A friction element is further arranged between the pressure ring and the second part of the device, which operates in an active position of the pressure ring, while the pressure ring releases the friction element in the other position, an array of spring tabs with their tab ends being fastened clearance-free in the region of the first part of the device. A corresponding array of redirecting links is further provided, which are flexibly supported on one end by the pressure ring and on the other end by the clear tab ends, for redirecting the axial movement of the pressure ring to a radial movement of the clear tab ends, both ends of the redirection elements being offset axially and radially from each other. According to DE 196 13 763 C1, a cylindrical drum is provided at the second part of the device, which overlaps the free tab ends radially, the friction element being arranged in the radial space between the cylinder surface of the drum and the free tab ends.

The objective of the present invention is to disclose an electromagnetic clutch, brake and/or lock, which enables a switchable connection of a powered and an unpowered or static part of a functional unit. In this connection, a torque-transmitting connection should be established in a first operating state, and in a second operating state, both parts are separated, thus preventing torque transmission. In addition, the clutch, brake and/or lock according to the present invention should require little installation space.

SUMMARY OF THE INVENTION

An electromagnetically operated unit, in particular a clutch, brake and/or lock for the implementation of a switchable radial connection of a powered part and an unpowered or static part is thus proposed. The unit comprises a first part is connected, in a rotationally fixed manner, to a second part of the device and a second part is connected, in a rotationally fixed manner, to a second part of the device, one part of the device disclosing a magnet and/or an electromagnet with magnetic poles actuating in the radial direction. The first part of the device will also be, as indicated below, the part of the device to be braked/locked or coupled.

The unit according to the present invention further comprises radially movable switching elements which are located about the circumference of the device and communicate with the corresponding contours and friction surfaces of the other part of the device to form a positive locking and/or frictional locking connection between the first part of the device and the second part of the device, each switching element being actuated when current is applied to the magnet, when designed as a closed-current system, to release and, when designed as an open-circuit system, to initiate the connection, against the force of at least one spring.

According to a first embodiment of the present invention, the switching elements may be supported on the magnet in the circumferential direction; the switching elements may further be carried floating or connected clearance free via the spring elements, if necessary.

According to the present invention, the poles of the electromagnet and the switching elements, actuating together with the poles, may be arranged such that, viewed radially, the switching elements can be temporarily biased inward (for example on a shaft) or outward (for example on a hollow shaft or housing) to implement positive and/or frictional engagement.

The switching elements may, for example, be designed as circular arc or straight segments.

Owing to the demands on radial locks, (e.g. torque, installation space, environment conditions, system requirements), the embodiment of the unit according to the present invention as a positive locking system appears as the preferred solution, because torque transmission is clearly higher with positive engagement compared to the friction system; in addition, positive engagement systems are comparatively unsusceptible to soiling with oil or grease.

To enable positive engagement, the switching elements such as teeth, cams, etc. are thus provided with contours which mesh with the counter contours of the parts that should be engaged/held.

With a positive engagement system, the speed of both parts to be connected should advantageously be almost synchronous at initiation of the connection in order to prevent damage or wear and tear.

If the electromagnetically operated unit according to the present invention is arranged as a clutch or brake, the embodiment as a positive engagement system, particularly for clutch or brake processes at differential speeds, is particularly advantageous. This also results in the advantage that switching may be implemented independently of the angular position of the parts of the device with respect to each other.

In an arrangement as a positive engagement system, the friction surfaces should be protected against soiling/oil/grease, etc. by adequate packing to achieve satisfactory friction values and consequently adequate torque.

Depending on the system requirements, the unit according to the present invention may be designed as either a closed current or open circuit system.

To reduce the necessary operating power or to increase the torque transmissible via the electromagnetically operated unit according to the present invention, the positive engagement as well as the frictional engagement embodiment may also be reinforced by a servo system. For this purpose, the force generated by the operating spring, with the closed current principle and/or the coil in the open circuit principle, is reinforced between the magnet and the switching element, for example, via a ball or a caster and a corresponding ramp of the component on which the switching element rests, the force strength depending on the arranged contact angles.

The electromagnetically operated unit presented here may be advantageously used in the automotive field for the fixation and/or release of components of an active front wheel steering system with the aim of providing optimal operating comfort with such active front wheel steering by means of a superimposed power train, and at the same time ensuring the function of the steering system via an electromagnetically operated unit whose engagement function guarantees steering by pinion.

BRIEF DESCRIPTION OF THE DRAWINGS

The present invention will be explained in more detail hereinafter in the exemplary attached FIGS., in which:

FIG. 1 is a schematic top view of a preferred embodiment of an electromagnetically operated unit according to the present invention as shown in FIG. 1, which is arranged as a closed current system;

FIG. 1A is a schematic sectional side view of the preferred embodiment of an electromagnetically operated unit according to the present invention as shown in FIG. 1 which is arranged as a closed current system;

FIG. 5 is a schematic sectional side view of a further preferred embodiment of an electromagnetically operated unit according to the present invention, which is arranged as a closed current system;

FIG. 5A is a schematic sectional top view of a further preferred embodiment of an electromagnetically operated unit according to the present invention, as shown in FIG. 5, which is arranged as a closed current system;

FIG. 7 is a schematic sectional side view of a fourth preferred embodiment of an electromagnetically operated unit according to the present invention, which is arranged as a closed current system; and FIG. 7A is a schematic sectional top view of a fourth preferred embodiment of an electromagnetically operated unit according to the present invention, as shown in FIG. 7, which is arranged as a closed current system;

DETAILED DESCRIPTION OF THE DRAWINGS

Figure 2:
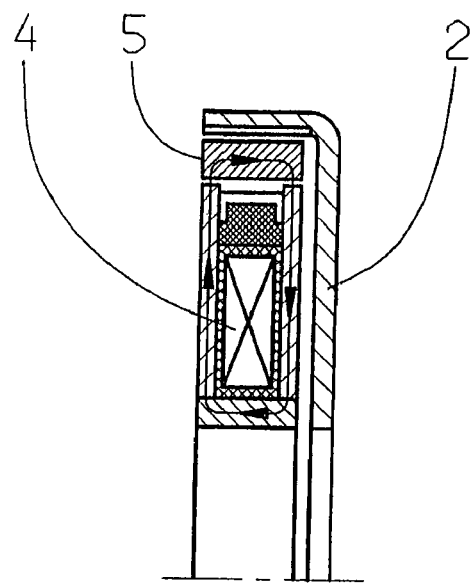
FIG. 2 is a schematic sectional view of the pole surfaces and magnetic circuit of the electromagnetically operated unit according to FIG. 1 in the open state.

With reference to FIGS. 1 and 1A, the electromagnetically operated unit 1 comprises a first part of the device 2 (part of the device for brake/clutch or lock purposes), which is designed as a flange and is connected in a rotationally fixed manner with a first part (not illustrated) to be connected, and a second part of the device 3, which is connected in a rotationally fixed manner with a second part to be connected.

The second part of the device 3 comprises a magnet and/or electromagnet 4 in the form of a coil with magnetic poles operating in the radial direction and switching elements 5, which are radially moveable, which are actuated with the magnetic poles of the magnet 4 and respective contours 6 and/or friction surfaces of the part of the device 3 for implementation of a positive engagement and/or frictionally engaged connection between the part of the device 2 to be braked/clutched or fixated and the part of the device 3.

In the described embodiment, the switching elements 5 are biased to communicate with the part of the device to be braked/clutched or fixated (flange 2), via radial pretensioned springs 7, preferably leaf springs, in the non-energized state of the coil 4, such that together with the corresponding contours 6, form a positive engagement connection. The connection is disengaged by energizing the coil 4 and/or the electromagnet to operate contrary to the pretensioning force of the springs 7, which attracts the switching elements 5.

The embodiment described as a closed current system is especially advantageous with regard to fail safe requirements, e.g. upon failure of the power supply, because in this case, the connection between both parts of the device 2, 3 is not released.

The magnetic circuit in the open state of the unit as shown in FIGS. 1 and 1A is exemplified with arrows in FIG. 2. Here, the switching elements 5 are pulled against the force of the springs 7, to disengage the connection.

Figure 3:
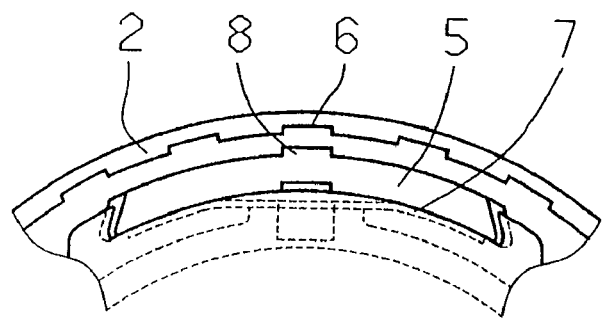
FIG. 3 is a schematic detailed view of the position of a switching element in the open state of the electromagnetically operated unit according to the present invention as shown in FIG. 1.
Figure 4:
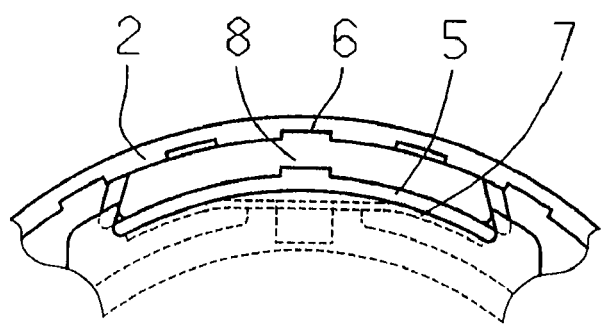
FIG. 4 is a schematic detailed view of the position of a switching element in the closed state of the electromagnetically operated unit according to the present invention as shown in FIG. 1.

FIG. 3 shows a schematic detailed view of the position of a switching element 5 in the open state, being designed as a closed current system with the electromagnetically operated unit 1; here, the switching element 5 is moved radially inward against the force of spring 7 by the magnetic force generated by operation of the electromagnet 4; in the non-energized state of the electromagnet a tooth 8 of the switching element 5 meshes with a corresponding contour 6 of the flange, via the force of spring 7, as illustrated in FIG. 4.

The subject matter of FIGS. 5 and 5A is an embodiment of the present invention, in which the electromagnetically operated unit 1 is designed as a positively engaged closed current system, the switching elements 5 are biased inwardly in the direction of a shaft 9, when viewed radially, to initiate a positively engaged connection between the first part of the device 2 and the second part of the device 3. Here, in the non-energized state of the electromagnet 4, each of the switching elements 5 is biased against the shaft 9 by the force of at least one pressure spring 7. To assist the spring force in the engagement of the switching element 5, a servo system may optionally be provided. This system includes a caster 10 and a respective ramp on which the switching element 5 rests. The ramp is located between the electromagnet 4 and the switching element.

Figure 6:
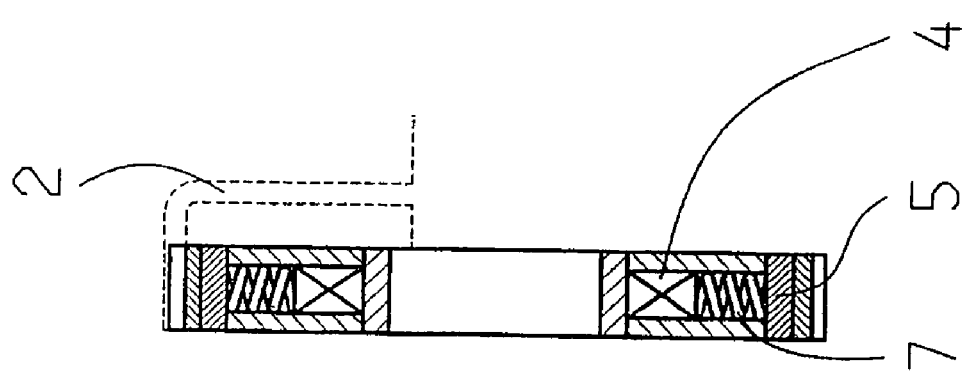
FIG. 6 is a schematic sectional side view of a third preferred embodiment of an electromagnetically operated unit according to the present invention, which is arranged as a closed current system.
Figure 6A:
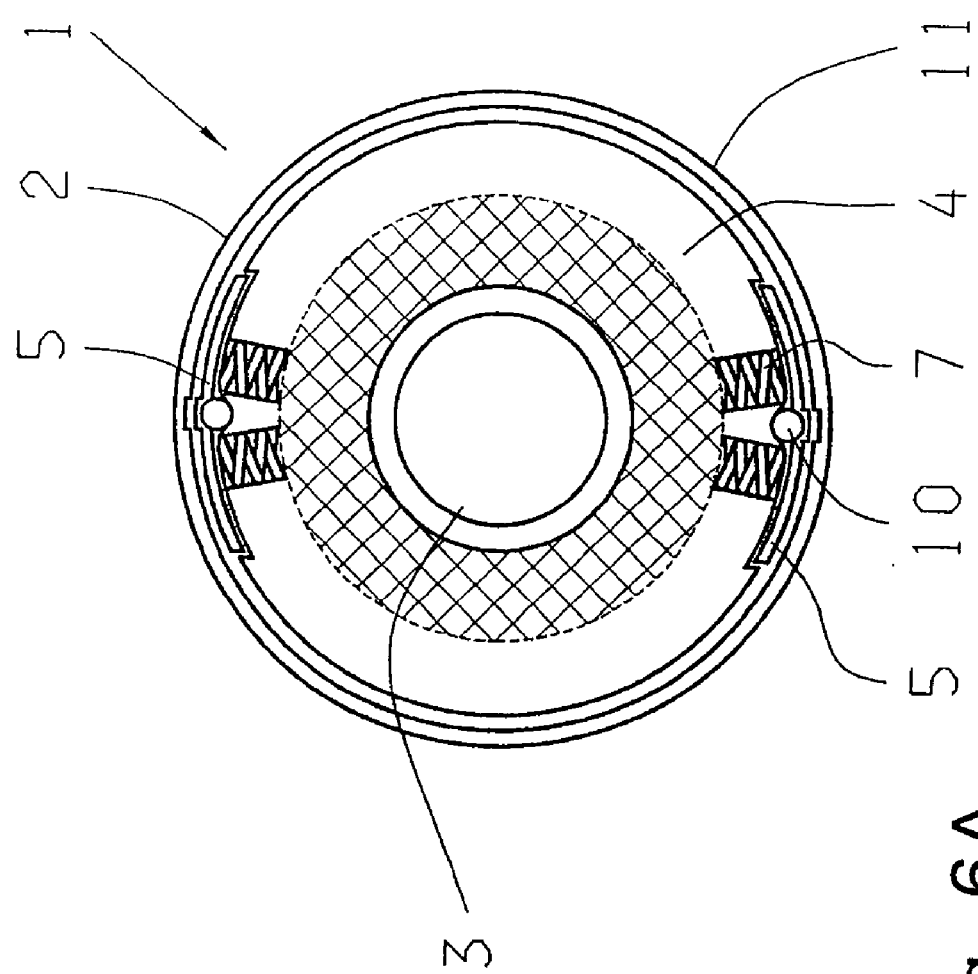
FIG. 6A is a schematic sectional top view of a third preferred embodiment of an electromagnetically operated unit according to the present invention, as shown in FIG. 6, which is arranged as a closed current system.

FIGS. 6 and 6A illustrate a further embodiment of the present invention, in which the electromagnetically operated unit 1 is arranged as a positively engaged closed current system, the switching elements 5 are biased outwardly, via the force of at least one pressure spring 7, in the direction of a hollow shaft 11 and/or a housing, when viewed radially, to initiate a positively engaged connection between the first part of the device 2 and the second part of the device 3. In the illustrated embodiment a servo system is provided to assist the spring force in the engagement of the switching element 5. The system includes a caster 10 and a respective ramp, on which the switching element 5 rests. The ramp is located between the electromagnet 4 and the switching element.

FIGS. 7 and 7A illustrate a further embodiment of the present invention, in which the electromagnetically operated unit 1 is designed as a positive engagement closed current system, the switching elements 5 are biased outwardly, via the force of at least one pressure spring 7, toward a hollow shaft 11 and/or a housing, when viewed radially, to initiate a positively engaged connection between the first part of the device 2 and the second part of the device 3. In this embodiment, a servo system is likewise provided, and includes a caster 10 for each switching element 5, the component on which the switching element 5 rests being arranged as a ramp.

If the electromagnetically operated unit is designed as an open circuit system, the engaging or coupling function and/or brake function is initiated, via the electromagnet, and the disconnection, via a spring element, for example. Here, the switching elements are advantageously released by the spring force of the part of the device to be braked/fixated or clutched; the connection is initiated by operation of the electromagnet with the switching elements being biased against the part of the device to be braked/clutched or fixated. In this arrangement the switching elements are preferably fixed to the part of the device to be braked/fixated or clutched.

Of course, any constructive embodiment, particularly any spatial arrangement of the components of the electromagnetically operated unit as such, as well as in relation to one another, to the extent they are technically expedient, falls under the scope of protection of the present claims, without influencing the function of the electromagnetically operated unit as described in the claims, even if these embodiments are not explicitly illustrated in the FIGS. or mentioned in the description.

| Reference numerals |
| --- |
| 1 Electromagnetically operated unit |
| 2 First part of the device, flange |
| 3 Second part of the device |
| 4 Magnet, electromagnet, coil |
| 5 Switching element |
| 6 Contour |
| 7 Spring |
| 8 Tooth |
| 9 Shaft |
| 10 Caster |
| 11 Hollow shaft |

The invention claimed is:

1. An electromagnetically operated unit for engaging and disengaging a radial connection between a driving part and a driven part, the unit comprising:

a first part (2) being fixed, in a slip free manner, to one of the driving part and the driven part, and the first part (2) having one of a contoured surface and a frictional surface;

a second part (3) being fixed, in a slip free manner, to the other of the driving part and the driven part, and the second part (3) of the unit supporting one of a plurality of magnets and a plurality of electromagnets (4) each of which has a magnetic pole;

the second part (3) of the unit further having radially displacable switching elements (5) supported about a circumference thereof, and the switching elements (5) having the other of the contoured surface and the frictional surface, and one of the contoured surface and the frictional surface having at least one fixed tooth (8) formed therein and the other of the contoured surface and the frictional surface having a plurality of recesses (6) formed therein, each sized to matingly receive the at least one fixed tooth (8) therein and form a positive engagement between the contoured surface and the frictional surface while remaining surfaces of the contoured surface and the frictional surface form a frictional engagement between the contoured surface and the frictional surface;

one of the contoured surface and the frictional surface, of the radially displacable switching elements (5), matingly engages with a corresponding one of the contoured surface and the frictional surface of the first part (2) to form the positive engagement and the frictional engagement between the first part (2) and the second part (3);

if the unit is a closed current system, then each of the switching elements (5) of the second part (3) are radially displaced toward the first part (2), when a current is applied to one of the plurality of magnets and the plurality of electromagnets (4), to release engagement between the first part (2) and the second part (3); but if the unit is an open current system, then each of the switching elements (5) of the second part (3) are radially displaced, against a force of at least one spring (7), away from the first pad (2), when the current is applied to one of the plurality of magnets and the plurality of electromagnets (4), to induce disengagement between the first part (2) and the second part (3).

2. The electromagnetic operating unit according to claim 1, wherein the switching elements (5) are one of floatingly supported to the second part (3) and supported in a clearance free fixed manner to the second part (3).

3. The electromagnetic operating unit according to claim 1, wherein the switching elements (5) and magnetic poles of one of the plurality of magnets and the plurality of electromagnets (4) are arranged such that, when viewed radially of the unit, the switching elements (5) are displaced one of radially inward and radially outward to induce engagement between the first part (2) and the second part (3).

4. The electromagnetic operating unit according to claim 1, wherein the switching elements (5) are one of arcuate segments and straight segments.

5. The electromagnetic operating unit according to claim 1, further comprising a servo system comprises one of a ball and a caster (10) and a ramp, located between the switching elements and one of the plurality of magnets and the plurality of electromagnets (4), and the servo system strengthening strengthens engagement between the first part (2) and the second part (3) to one of reduce the applied current and increase a transmissible torque via the electromagnetically operated unit (1).

6. The electromagnetic operating unit according to claim 1, wherein the unit is a closed current system and each of the switching elements (13), in an non-energized state of one of the plurality of magnets and the plurality of electromagnets (4), is forced by the at least one spring (7) against the first part (2) to implement a positive locking connection, and the switching elements (5) are secured to the second part (3) supporting the electromagnet (4).

7. The electromagnetic operating unit according to claim 1, wherein the unit is a closed current system and each of the switching elements (5), in an non-energized state of one of the plurality of magnets and the plurality of electromagnets (4), is forced by the at least one spring (7) against the first part (2) to implement a positive locking connection, and the switching elements (5) matingly engage with the first part (2).

8. The electromagnetic operating unit according to claim 1, wherein the plurality of recesses (6) are formed in the contoured surface and the recesses (6) are substantially equally spaced from one another about a circumference of the contoured surface.

9. The electromagnetic operating unit according to claim 8, wherein the contoured surface also has a frictional braking area which is located between respective pairs of the recesses (6) for achieving the frictional engagement between the contoured surface and the frictional surface.

10. An electromagnetically operated unit for engaging and disengaging a radial connection between a driving part and a driven part, the unit comprising:
- a first part (2) being fixed to one of the driving part and the driven part, and the first part (2) having one of a contoured surface and a frictional surface;
- a second part (3) being fixed to the other of the driving part and the driven part, and the second part (3) of the unit supporting one of a plurality of magnets and a plurality of electromagnets (4) each of which has a magnetic pole; the second part (3) supporting a pair of radially displacable switching elements (5) about a circumference thereof, and the switching elements (5) having one of a contoured surface and a frictional surface,
- one of the contoured surface and the frictional surface having at least one fixed tooth (8) formed therein and the other of the contoured surface and the frictional surface having a plurality of recesses (6) formed therein, each recess (6) being sized to matingly receive the at least one fixed tooth (8) therein and form a positive engagement between the contoured surface and the frictional surface; and the contoured surface and the frictional surface, when engaged with one another, also achieve a frictional engagement between the first part (2) and the second part (3);
- the unit is one of a closed current system and an open current system, in the closed current system, each of the switching elements (5) of the second part (3) is radially displaced toward the first part (2), when a current is applied to one of the plurality of magnets and the plurality of electromagnets (4), to release engagement between the first part (2) and the second part (3); and in the open current system, each of the switching elements (5) of the second part (3) is radially displaced, against a force of at least one spring (7), away from the first part (2), when the current is applied to one of the plurality of magnets and the plurality of electromagnets (4), to induce disengagement between the first part (2) and the second part (3);
- the switching elements (5) are arcuate segments; and
- the at least one fixed tooth (8) is form in the frictional surface and the plurality of recesses (6) are formed in the contoured surface and are substantially equally spaced from one another about a circumference of the contoured surface.

\* \* \* \* \*